(12) United States Patent
Chen

(10) Patent No.: US 7,351,324 B2
(45) Date of Patent: Apr. 1, 2008

(54) LIQUID FUEL APPLYING TO VARIOUS COMBUSTION SYSTEMS WITH HIGH HEATING VALUE, HIGH VOLATILE, LOW POLLUTION AND LOW PRICE

(75) Inventor: Hong-Lin Chen, 8Fl.-3, No. 311, Sec. 4, Jungshiau E. Rd., Daan Chiu, Taipei (TW) 106

(73) Assignees: Hong-Lin Chen, Taipei (TW); Elaine Ling, Walnut, CA (US)

( * ) Notice: Subject to any disclaimer, the term of this patent is extended or adjusted under 35 U.S.C. 154(b) by 653 days.

(21) Appl. No.: 10/350,026

(22) Filed: Jan. 24, 2003

(65) Prior Publication Data
US 2004/0144688 A1    Jul. 29, 2004

(51) Int. Cl.
*C10L 1/16* (2006.01)
*C10M 107/00* (2006.01)

(52) U.S. Cl. .............. 208/15; 208/28; 208/30; 208/32; 208/37; 208/79; 208/354; 585/833; 554/14; 266/44; 239/406; 210/208; 204/559

(58) Field of Classification Search .......... 62/537, 62/540; 75/447; 123/559, 557; 196/14.5; 204/559; 208/15, 24, 28, 30, 32, 37, 79, 208/354; 210/208; 239/406; 266/44; 554/14; 585/833
See application file for complete search history.

(56) References Cited

U.S. PATENT DOCUMENTS 4,262,790 A * 4/1981 Castiglione ............... 196/14.5
4,673,490 A * 6/1987 Subramanian et al. ...... 208/354
5,578,090 A * 11/1996 Bradin ........................ 44/308

FOREIGN PATENT DOCUMENTS

WO    WO 01/92441 A1 *    4/2001

OTHER PUBLICATIONS

Diesel Fuel Refining and Chemistry, Chevron Web p. 1-5.*

* cited by examiner

*Primary Examiner*—Glenn Caldarola
*Assistant Examiner*—Prem C. Singh
(74) *Attorney, Agent, or Firm*—Bacon & Thomas, PLLC

(57) ABSTRACT

The present invention relates to a liquid fuel blended by dissolving crude pentane into the heavy oil with different proportions, and applied to different combustion system respectively; the fuel thus formed is easily dissolved, volatilized, atomized and vaporized into fine vapor articles, so it will burn completely to not only increase the heat value but also reduce the pollution without producing the dense smoke like common heavy oil combustion furnace. In addition, alkanes with low price, low octane value and high volatility substitute or blend with the crude pentane to become a liquid fuel having suitable initial boiling point, viscosity and fluidity as well as low price and low pollution, which is much better than common diesel oil.

6 Claims, No Drawings

LIQUID FUEL APPLYING TO VARIOUS COMBUSTION SYSTEMS WITH HIGH HEATING VALUE, HIGH VOLATILE, LOW POLLUTION AND LOW PRICE

BACKGROUND OF THE INVENTION

Field of the Invention

Firstly, Most industrial combustion systems burn heavy oil owing to its low price and safe storage, however, heavy oil has a too high boiling point to vaporize, as that of A-class heavy oil is 388° C., and B and C-class heavy oil as high as 480° C. Heavy oil is usually incompletely vaporized and burned with large atomized articles due to its little volatility and high viscosity, consequently, though combustion furnaces adopt high-pressure spraying and rotary types to enhance atomization, much of the heat value is lost and dense smoke produced by incomplete burning will cause pollution.

Secondly, being the most useless in the productions of oil refining, the crude pentane is usually destroyed by burning on the top of high tower, but it dissolves the heavy oil with considerable volatility, super atomization and evaporability. Boiling point from 25° C. to 60° C., it may be stored under normal temperature without needing high-pressure steel cylinder, therefore it is absolutely a waste utilization with lower cost than heavy oil; Alternatively, crude pentane is partially or completely replaced by inexpensive alkane (hexane, heptane, octane and nonane) with low octane value (high cetane value) and high volatility (alkane alone or blend with more than two kinds of alkane). Lower in cost and limited in use as unable to be blended with gasoline due to its low octane value, alkane may become a liquid fuel with low price and low pollution in proper initial boiling point, viscosity and fluidity according to different conditions of storage and special requirements of combustion systems; in addition, it may be made into high, medium and low octane value fuels for high, medium and low speed diesel oil engines respectively because the low octane value (normal hexane octane 25, normal heptane 0, normal octane −19) of crude pentane is its high cetane value, like kerosene octane value 25~35, cetane value 47.

In the view of conditions above, the inventor of the present invention devoted himself to dissolving heavy oil in appropriate amount of crude pentane, and after many experiments, at last invented various liquid fuels suitable for all kinds of combustion systems (including various combustion furnaces and diesel oil engines), which are characterized with complete combustion, high volatility, high heat value and low pollution as well as lower the cost through utilizing waste, hereby apply for the patent for implementation and contribute to development of the industry.

SUMMARY OF THE INVENTION

The present invention is to provide a liquid fuel with high heating value, high volatility, low pollution and low price for all kinds of combustion systems with different formulas, and the liquid fuel is in low price and low pollution in proper initial boiling point, viscosity and fluidity based on different conditions of storage and special requirements of combustion systems.

The other purpose of the present invention is to provide a liquid fuel with high heat value, high volatility, low pollution and low price suitable for all types of combustion systems, and to substitute diesel oil based on its different formulas in diesel oil engines with high, medium and low speeds.

Another purpose of the present invention is to provide a liquid fuel with high heat value, high volatility, low pollution and low price suitable for all types of combustion system, hereby saving resources by utilization of the waste.

DETAILED DESCRIPTION OF THE INVENTION

The present invention makes crude pentane a dissolvent, in which heavy oil is dissolved to form a solution, which improves the volatility and reduces viscosity of heavy oil; the blending proportion of them is as follows:

| | |
|---|---|
| Crude pentane | 90%~10% |
| Heavy oil | 10%~90% |

The formulas of perfect embodiment suitable for different combustion furnaces are:

| | Crude pentane | heavy oil |
|---|---|---|
| (1) Chlorination combustion furnace | 80% | 20% |
| (2) Oil pressure spraying combustion furnace | 50% | 50% |
| (3) Rotary type combustion furnace | 30% | 70% |

Part or all of the crude pentane above are replaceable with low-price alkane having low octane value and high volatility, such as hexane, heptane, octane and nonane. Having a boiling point between 60° C. and 220° C., crude pentane is extremely inexpensive and useless due to its low octane value and impossibility to be blended with gasoline. (The above is made of one alkane only or more than two kinds of alkane).

Additionally, putting into the liquid fuel of the present invention certain or all paraffin with low octane value and high cetane value, such as hexane, heptane, octane, nonane, decane, hendecane and dodecane, will reduce the octane value and increase cetane value, and as its low octane value (normal hexane 25, normal heptane 0, normal octane 019) is high cetane value, such as cetane value of kerosene 25-35, cetane value 47, therefore, the liquid fuel may be blended to substitute the diesel oil for the diesel oil engine and also achieve high heat value, low cost and low pollution.—The liquid fuel described above is made up of one single alkane or more than two kinds of alkane.—The formula of preferred embodiment for the liquid fuel is suitable for high, medium and low speed diesel oil engine with the details as follows:

(1) The fuel suitable for high-speed diesel engines:

| | |
|---|---|
| Hexane | 0% |
| Heptane | 30% |
| Octane | 60% |
| Heavy oil | 10% |

According to tests, the fuel of this formula, with the cetane value between 40-60, is suitable for high-speed diesel engines.

(2) The fuel suitable for medium-speed diesel engines:

| | |
|---|---|
| Crude pentane | 10% |
| Hexane | 10% |
| Heptane | 20% |
| Octane | 10% |
| Nonane | 5% |
| Decane | 5% |
| Heavy oil | 25% |

Its cetane value is between 35-45.

(3) The fuel suitable for low-speed diesel engines:

| | |
|---|---|
| Crude pentane | 10% |
| Hexane | 10% |
| Heptane | 10% |
| Octane | 10% |
| Nonane | 5% |
| Decane | 5% |
| Undecane | 5% |
| Dodecane | 5% |
| Heavy oil | 40% |

The fuel of this formula, with the cetane value reduced to less than 35, is suitable for low-speed diesel engines.

The above heavy oil is a kind of A-class heavy oil, such as common diesel, high grade diesel, biodiesel or biological greases (e.g. soybean oil, peanut oil, animal oil, waste animal and vegetable oil) and derivant of biological grease (e.g. soybean oil, peanut oil, animal oil, and derivant like waste animal and vegetable oil), or is substituted by the compound of more than two elements mentioned above. When it is used for high, medium or low-speed diesel engines, the heavy oil rate will be adjusted higher within 90%.

The technical parameters provided in the invention are the basic date of preferred embodiment, wherein 3%~5% allowance is acceptable. In all, in low price and low pollution, the liquid fuel blended on the basis of crude pentane, heavy oil and the alkane with low price, low octane value (high cetane value) and high volatility (the boiling point is 60° C.~22° C.) has appropriate initial boiling point, viscosity and fluidity according to the different storage conditions and the specific requirements of different combustion systems; otherwise, the alkane with high cetane value, such as normal-, iso-, and/or cyclo-hexane, -heptane, -octane, -nonane, -decane, -undecane, and -dodecane etc. (with one single alkane or more than two kinds of alkane), is blended with or replacing crude pentane in the basic formula of heavy oil, to constitute a liquid fuel for diesel engine in the place of diesel. No matter how the formula is adjusted, it is still covered by the present invention.

What is claimed is:

1. A liquid fuel with high heat value, high volatility, low pollution and low price suitable for all kinds of combustion systems including diesel engine combustion systems, comprising biological grease or its derivatives dissolved into an alkane mixture, wherein the alkane mixture consists of one normal isomer of $C_6$ to $C_{12}$ alkanes and one or more alkanes selected from the group consisting of iso-isomers of $C_6$ to $C_{12}$ alkanes and cyclo-isomers of $C_6$ to $C_{12}$ alkanes, after second occurrence without any addition of petroleum diesel or biodiesel, and after being dissolved into the alkane mixture, the biological grease or its derivatives has a higher volatility and a lower viscosity, which makes the fuel easily dissolved and dispersed, and results in fine vapor particles through volatilization, atomization and vaporization, thus it will burn completely not only to increase the heat value, but also eliminate pollution; and
wherein the range of the alkane mixture and biological grease or its derivatives is: alkane mixture 90%~10% biological grease or its derivatives 10%~90%.

2. The liquid fuel according to claim 1, wherein the liquid fuel has a cetane value of from 40 to 60 in case of using for high-speed diesel engine.

3. The liquid fuel according to claim 1, wherein the liquid fuel has a cetane value of from 35 to 45 in case of using for medium-speed diesel engine.

4. The liquid fuel according to claim 1, wherein the liquid fuels has a cetane value of less than 35 in case of using for low-speed diesel engine.

5. The liquid fuel according to claim 1, wherein the biological grease is selected from the group consisting of soybean oil, peanut oil, animal oil, waste oil and vegetable oil.

6. The liquid fuel according to claim 1 wherein derivative of biological grease is selected from the group consisting of a derivant of soybean oil, a derivant of peanut oil, a derivant of animal oil, a derivant of waste oil and a derivant of vegetable oil.

* * * * *